United States Patent [19]
Adachi

[11] Patent Number: 5,442,643
[45] Date of Patent: Aug. 15, 1995

[54] INTEGRATED CIRCUIT CHIP WITH TESTING CIRCUITS AND METHOD OF TESTING THE SAME

[75] Inventor: Kaoru Adachi, Tokyo, Japan

[73] Assignee: Fuji Photo Film Co., Ltd., Kanagawa, Japan

[21] Appl. No.: 35,595

[22] Filed: Mar. 23, 1993

[30] Foreign Application Priority Data

Apr. 7, 1992 [JP] Japan ................................ 4-085649

[51] Int. Cl.⁶ .......................................... G01R 31/28
[52] U.S. Cl. .................. 371/22.5; 371/22.1; 371/22.3; 371/22.6; 324/158 R
[58] Field of Search ............. 371/22.1, 22.3, 22.5, 371/22.6; 324/158 R

[56] References Cited

U.S. PATENT DOCUMENTS

| | | |
|---|---|---|
| 3,082,374 | 3/1963 | Buch . |
| 4,099,668 | 7/1978 | Feilchenfeld et al. ............. 371/22.1 |
| 4,348,759 | 9/1982 | Schnurmann ..................... 371/22.1 |
| 4,395,767 | 7/1983 | Van Brunt et al. ................. 371/22.1 |
| 4,701,922 | 10/1987 | Kuboki et al. ..................... 371/22.3 |
| 5,084,874 | 1/1992 | Whetsel, Jr. ....................... 371/22.3 |
| 5,189,365 | 2/1993 | Ikeda et al. ....................... 324/158 R |
| 5,214,655 | 5/1993 | Eichelberger et al. ............. 371/22.5 |

*Primary Examiner*—Emanuel T. Voeltz
*Assistant Examiner*—Alan Tran

[57] ABSTRACT

An integrated circuit (IC) chip which can be tested even after being packaged on a circuit board together with other IC chips, and a method of testing such IC chips on the circuit board are provided. The IC chip has a main IC section to which a particular function is assigned, and a plurality of testing circuits capable of freely extracting output data of the main IC section on a common bus. An interface is also provided on the IC chip which receives signals for controlling the testing circuits from the outside. The testing circuits, therefore, can selectively hold data sent from the outside or data from the main IC section and then send the data out via input/output terminals thereof or the interface.

13 Claims, 4 Drawing Sheets

INTEGRATED CIRCUIT CHIP WITH TESTING CIRCUITS AND METHOD OF TESTING THE SAME

BACKGROUND OF ME INVENTION

1. Field of the Invention

The present invention relates to an integrated circuit (IC) chip having testing circuits and a method of testing the same and, more particularly, to an IC chip with testing circuits which can be tested even alter packaged on a circuit board, and a method of testing the same.

2. Description of the Related Art

IC chips including large scale integrated circuit (LSI) chips are usually tested by an IC checker or similar testing device before shipment to see if their functions are normal. Specifically, the test result is compared with, for example, a test pattern provided at the designing stage. With a logic IC chip, for example, it is a common practice to input desired data in the IC chip via the input terminal of the IC chip and determine whether or not expected data appears on the output terminal of the IC chip. It is, therefore, possible to fully test IC chips one by one before packaging on a circuit board. However, the problem with conventional IC chips is that when a plurality of chips are packaged on a single circuit board, they cannot be checked or tested one by one due to their mutual influence as well as the influence of surrounding elements, particularly the connections thereof. Assume that after all the IC chips and surrounding elements have been mounted on a circuit board, an error occurs during actual drive. Then, a defective IC chip or a defective wiring cannot be located on the circuit board. The only measure left is to remove all the IC chips from the circuit board and then test them one by one while testing the wirings again which increases the cost due to additional time and labor.

SUMMARY OF THE INVENTION

It is, therefore, an object of the present invention to provide an IC chip with testing circuits which, when packaged on a circuit board together with other IC chips, can be tested effectively and independently of the others.

It is another object of the present invention to provide a method of testing a plurality of IC chips packaged together on a circuit board one by one.

In accordance with the present invention, an IC chip comprises a main IC section having a predetermined function, a plurality of testing circuits connected to the main IC section for freely extracting data inputted to or outputted from the main IC section, and an interface for selectively inputting test data from the outside to the plurality of testing circuits or outputting test data from the plurality of testing circuits to the outside. The testing circuits each has a test data holding section for selectively holding output data of the main IC section or test data from the outside, and an inputting/outputting section for selectively inputting or outputting data fed from the test data holding section or data sent from the outside, whereby the IC chip can be tested after being mounted on a circuit board.

Also, in accordance with the present invention, a method of testing an IC chip after the IC chip has been mounted on a circuit board comprises the steps of integrating on the circuit board a main IC section having a predetermined function, a plurality of testing circuits for freely extracting data inputted to or outputted from the main IC section, and an interface for selectively inputting test data from the outside to the plurality of testing circuits or outputting test data from the plurality of testing circuits to the outside; connecting a testing device to the IC chip for selectively sending or receiving predetermined test data to or from the IC chip via the interface after the IC chip has been mounted on the circuit board; confirming connection of the testing device and the IC chip by sending the test data from the testing device to the plurality of testing circuits, returning the test data from the plurality of testing circuits to the testing device via the interface, and then determining whether or not the test data returned is outputted correctly by the testing device; repeating the confirmation with another IC chip packaged together on a single circuit board and also having a main IC section, a plurality of testing circuits, and an interface; connecting the plurality of testing circuits of the respective IC chips; confirming connection of the IC chips by inputting test data from the testing device in the plurality of testing circuits of any one of the IC chips, transferring the test data to the plurality of testing circuits of the other IC chip, returning received data from the plurality of testing circuits of the other IC chip to the testing device via the interface of the other IC chip, and then determining whether or not the test data is outputted correctly by the testing device; and testing a function of each of the IC chips by extracting output data of the main IC section of any one of the IC chips by the plurality of testing circuits of the one IC chip, transferring the output data to the plurality of testing circuits of the other IC chip, returning the output data from the plurality of testing circuits of the other IC chip to the testing device via the interface of the other IC chip, and then testing the received data by the testing device.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
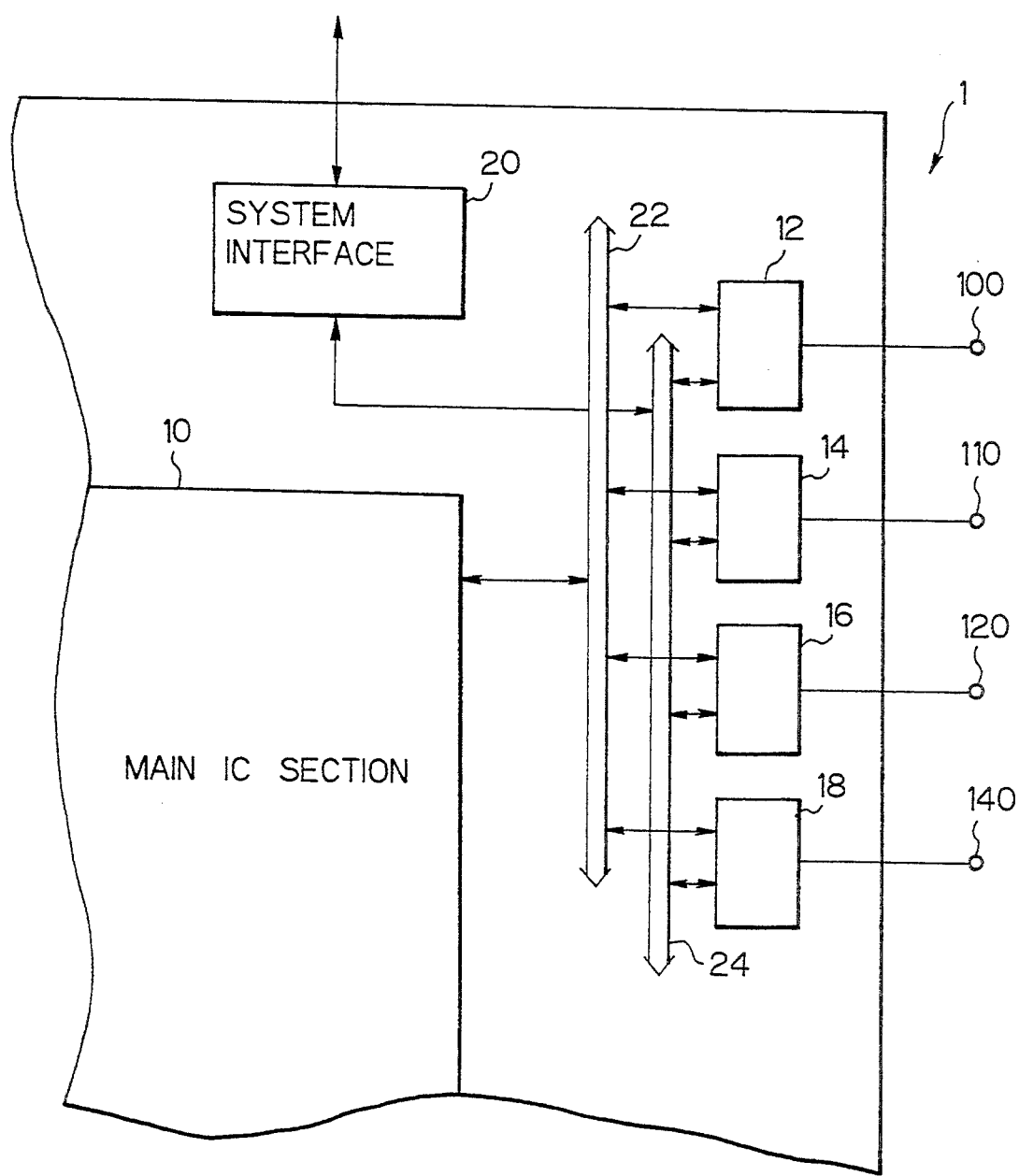
FIG. 1 is a fragmentary enlarged view of an IC chip with testing circuits for one embodiment of the present invention.

Referring to FIG. 1 of the drawings, an IC chip with checking or testing circuits for one embodiment of the present invention is shown and generally designated by the reference numeral 1. As shown, the IC chip 1 has a logic or similar main IC section 10 having predetermined functions, e.g., data processings, a plurality of testing circuits 12, 14, 16 and 18 capable of freely extracting data from the main IC section 10, and a system interface 20 for selectively delivering data inputted from the outside to the testing circuits 12, 14, 16 and 18 or sending data from the testing circuits 12, 14, 16 and 18 to the outside. The testing circuits 12, 14, 16 and 18 are identical in construction and connected to the main IC section 10 and the system interface 20 by a first common bus 22 and a second common bus 24, respectively. The testing circuits 12, 14, 16 and 18 have respectively input/output terminals 100, 110, 120 and 140 which will not be connected to a circuit board when the IC chip 1 is mounted on the circuit board.

Figure 2:
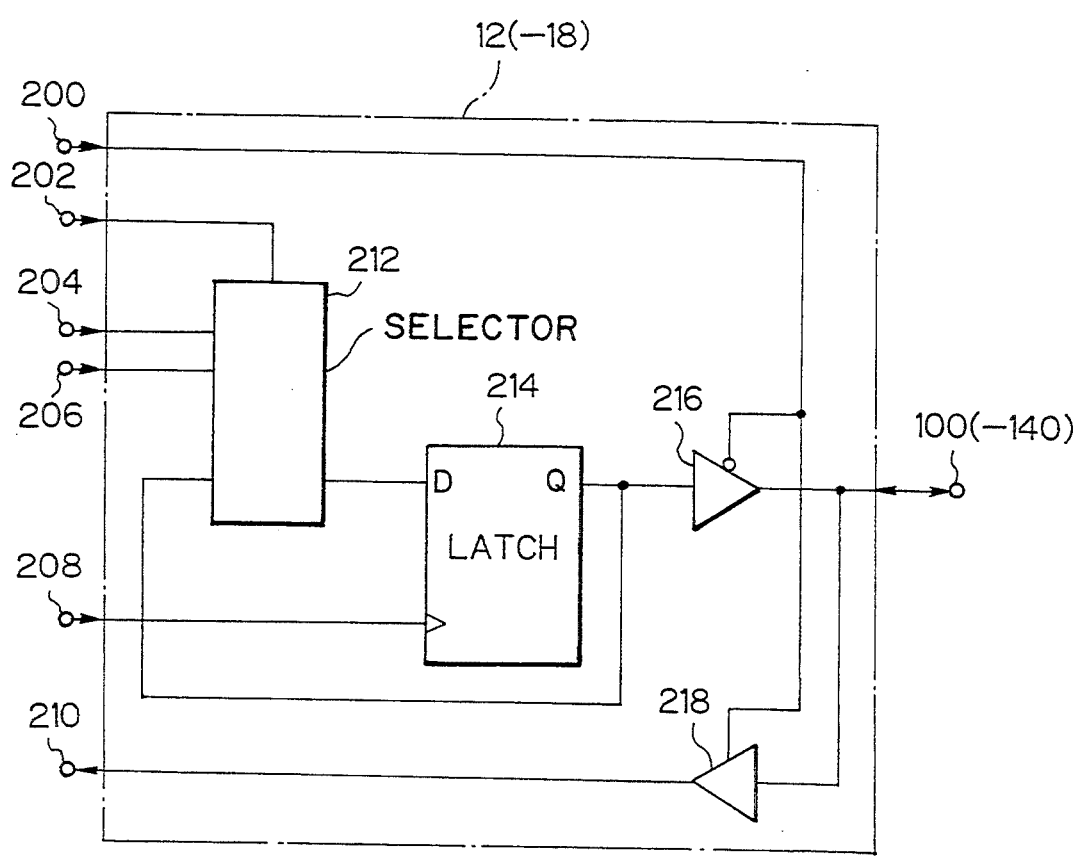
FIG. 2 is a block diagram schematically showing a specific construction of one of the testing circuits shown in FIG. 1.

A specific construction of the testing circuits 12, 14, 16 and 18 will be described with reference to FIG. 2, taking the testing circuit 12 as an example. As shown, the testing circuit 12 has five input terminals 200, 202, 204, 206 and 208 and a single output terminal 210 in addition to the above-mentioned input/output terminal 100. A selector 212, a latch 214, and two tristate buffers 216 and 218 are connected, as illustrated. The input terminal 200 is connected to the common bus 24, FIG. 1, to receive a control signal fed from the outside via the interface 20. The control signal from the input terminal 200 is delivered to the control terminals of the two tristate buffers 216 and 218. The input terminal 200 changes the state of the input/output terminal 100 in response to the control signal. Specifically, when the control signal is applied to the input terminal 200 from the outside, the tristate buffer 218 is turned on so that data coming in through the input/output terminal 100 is fed out via the output terminal 210. When the control signal is not applied to the input terminal 200, the tristate buffer 216 is turned on to output data via the input/output terminal 100.

The input terminal 202 is connected to the common bus 24 to receive a switching signal from the outside via the interface 20. The switching signal is delivered to the control terminal of the selector 212. Specifically, when a first switching signal is applied to the input terminal 202, the selector 212 selects data which is input thereto through the input terminal 204. When a second switching signal is applied to the input terminal 202, the selector 212 selects data which is input thereto through the input terminal 206. Further, on the arrival of a third switching signal at the input terminal 202, the selector 212 selects a signal fed back from the latch 214. The input terminal 204 is also connected to the common bus 24. Test data from the outside is routed through the interface 20 and input terminal 204 to the selector 212. The input terminal 206 is connected to the common bus 22 to transfer data from the main IC section 10 to the selector 212.

The selector 212 delivers the test data from the input terminal 204 or the data from the input terminal 206 to the latch 214. The latch 214 latches the data from the selector 212 and outputs the data in response to a clock signal applied to the input terminal 208. Specifically, connected to both the common busses 22 and 24, the input terminal 208 receives a clock signal from the outside or from the main IC section 10 which is synchronous with the associated output data. The latch 214 has one output terminal connected to the input terminal of the tristate buffer 216 and the other output terminal connected to the input terminal of the selector 212. Hence, the latch 214 outputs data via the tristate buffer 216 and latches data fed back via the selector 212. The output terminal 210 is connected to the common bus 24 to deliver data fed via the tristate buffer 218 to the outside via the interface 20. The other testing circuits 14, 16 and 18 are identical in construction with the testing circuit 12.

Figure 3:
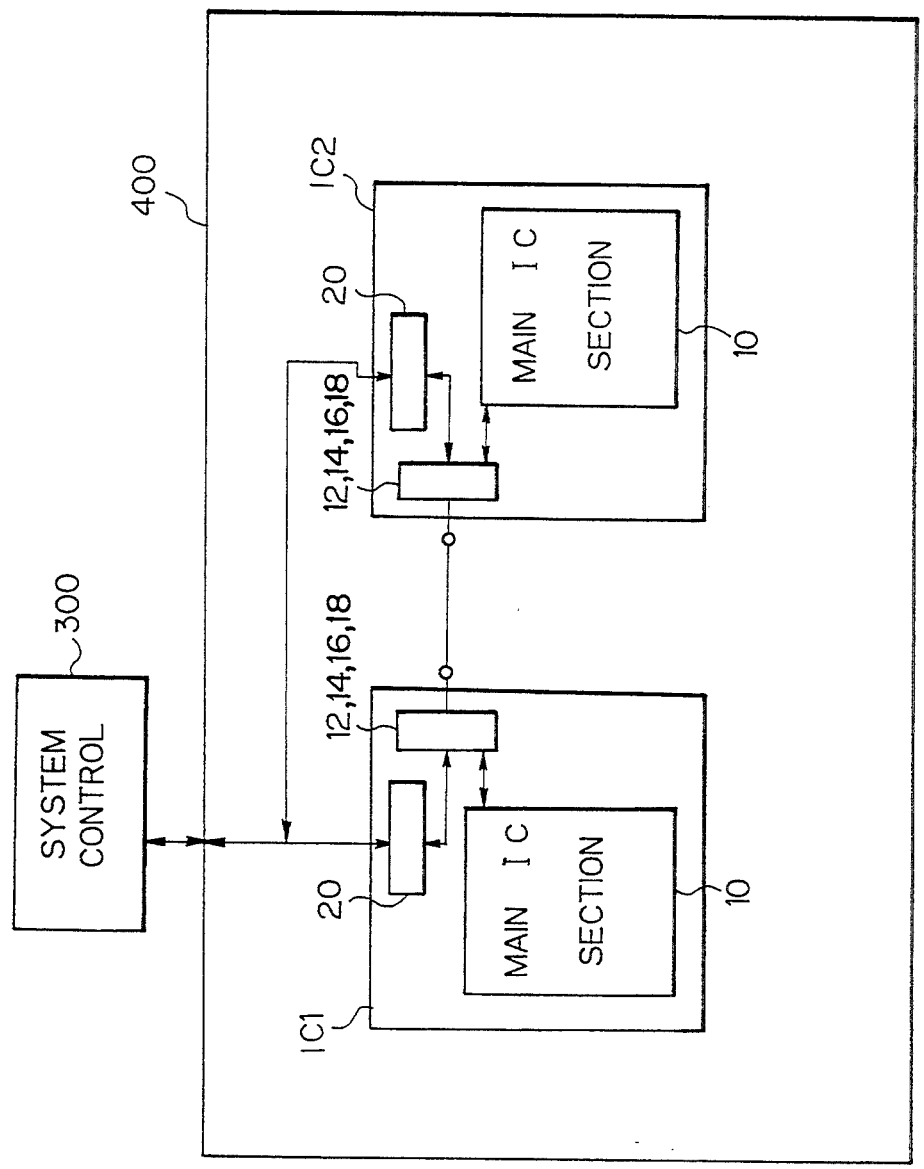
FIG. 3 is a view schematically showing an embodiment of a printed circuit board according to an embodiment of the invention, useful for understanding a method of testing a plurality of IC chips each having the testing circuits.

In the illustrative embodiment, the tour testing circuits 12, 14, 16 and 18 are integrated on the IC chip 1, as shown in FIG. 1. FIG. 3 shows two IC chips IC1 and IC2 mounted on a circuit board 400 which each have the testing circuits 12, 14, 16 and 18. It is to be noted that in FIG. 3 elements and wirings around the IC chips IC1 and IC2 are not shown since they are not relevant to the understanding of the embodiment.

A procedure for testing the IC chips IC1 and IC2 will be described with reference to FIGS. 1-3. First, the interfaces 20 of the IC chips IC1 and IC2 are connected to a system controller 300 located at the outside of the circuit board 400. To set up a test mode, the system controller 300 sends a first switching signal to the testing circuits 12, 14, 16 and 18 of the IC chips IC1 and IC2 via their interfaces 20. In response, the selector 212 built in each of the testing circuits 12, 14, 16 and 18 becomes ready to receive test data from the system controller 300. This is followed by a step of confirming the connection of the interfaces 20 to the system controller 300. Specifically, the system controller 300 sends test data of any desired value to the latches 214 of the testing circuits 12, 14, 16 and 18 via the interfaces 20 of the IC chips IC1 and IC2. The test data is written to the testing circuits 12, 14, 16 and 18. Subsequently, the system controller 300 sequentially turns off a control signal being applied to the input terminals 200 of the testing circuits 12, 14, 16 and 18 Via the interfaces 20. As a result, the tristate buffers 216 of the testing circuits 12, 14, 16 and 18 are turned on one after another to in turn send data latched by the latch circuits 2 14 one after another to the system controller 300 via the associated input/output terminals 100, 110, 120 and 140 and interfaces 20. Then, the system controller 300 compares each of the data sent from the testing circuits 12, 14, 16 and 18 with the initial test data to see if the former is identical with the latter. If one or more of the received data are not identical with the initial test data, the system controller 300 determines that one or both of the IC chips IC1 and IC2 including the faulty latch or latches 214 are connected to the system controller 300 in a defective manner. Then, the IC chips IC1 and IC2 will be once disconnected from the system controller 300 and then connected correctly.

If the connection of the IC chips IC1 and IC2 to the system controller 300 is complete, the connection of the IC chips IC1 and IC2 to each other is tested by the following procedure. To begin with, the input/output terminals 100, 110, 120 and 140 of the testing circuits 12, 14, 16 and 18 of the IC chip IC1 and the corresponding input/output terminals 100, 110, 120 and 140 of the testing circuits 12, 14, 16 and 18 of the IC chip IC2 are connected together. In this condition, the system controller 300 turns off the control signal being applied to the testing circuits 12, 14, 16 and 18 of, for example, the IC chip IC1, thereby conditioning the associated input/output terminals 100, 110, 120 and 140 for an output mode. Subsequently, the system controller 300 turns on the control signal being fed to the testing circuits 12, 14, 16 and 18 of the IC chip IC2 to condition their input/output terminals 100, 110, 120 and 140 for an input mode, writes any desired value in the IC chip IC1, and then reads the resulting output data of the IC chip IC1 via the IC chip IC2. If one or more of the data read out via the IC chip IC2 are not identical with the data previously written to the IC chip IC1, the system controller 300 determines that the testing circuit or circuits 12, 14, 16 and 18 of the, IC chip IC1 with such an error is connected in a defective manner. Then, the testing circuit or circuits 12, 14, 16 and 18 in question will be reconnected correctly.

How a test pattern is fed from the main IC section 10 of the chip to be tested is as follows. Assume that the IC chip IC2 is the subject of test by way of example. Then, the system controller 300 sends a second switching signal to the testing circuits 12, 14, 16 and 18 of the IC chip IC2 to prepare them for the reception of a test pattern from the associated main IC section 10. Subsequently, the system controller 300 turns off the control signal to the input terminals 200 of the testing circuits 12, 14, 16 and 18 of the IC chip IC1 to allow a test pattern to be fed from each of the terminals of the IC chip IC2 to the corresponding terminal of the IC chip IC1. In this condition, in the IC chip IC2 a test pattern from the main IC section 10 is written to each of the testing circuits 12, 14, 16 and 18 and then transferred to the IC chip IC1. As a result, the test patterns from the testing circuits 12, 14, 16 and 18 of the IC chip IC2 are written to the corresponding testing circuits 12, 14, 16 and 18 of the IC chip IC1. Finally, the system controller 300 reads the test pattern out of the testing circuits 12, 14, 16 and 18 of the IC chip IC1 to determine whether or not the the IC chip IC2 is defective.

As stated above, the IC chips IC1 and IC2 of the illustrative embodiment each has, in addition to the main IC section 10, a plurality of testing circuits 12, 14, 16 and 18 for extracting data from the main IC section 10. The data from the testing circuits 12, 14, 16 and 18 are sent to the system controller 300 via either of the input/output terminals 100, 110, 120 and 140 and the output terminal 210, and the interface 20. The IC chips IC1 and IC2, therefore, can be tested even after packaging on the circuit board 400.

Figure 4:
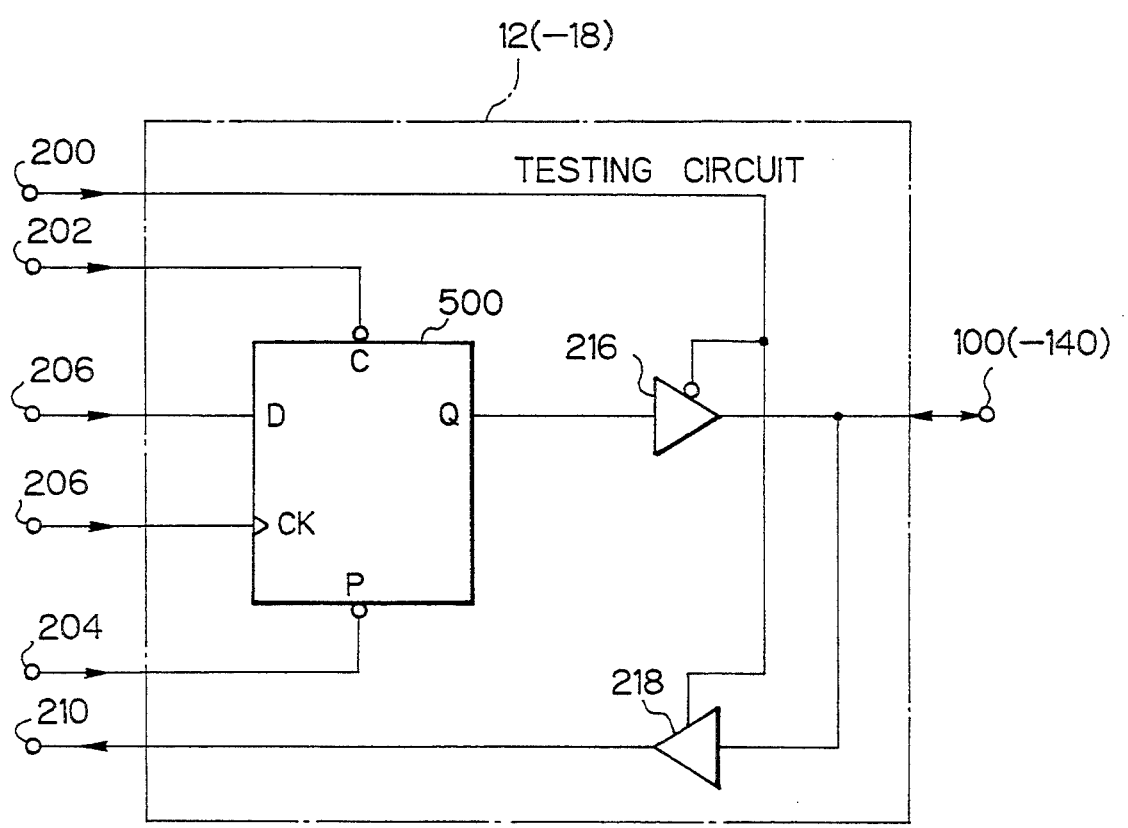
FIG. 4 is a block diagram schematically showing another specific construction of one of the testing circuits shown in FIG. 1.

Referring to FIG. 4, another specific construction of the testing circuit 12 will be described. It is to be noted that the construction shown in the figure may apply to the other testing circuits 14, 16 and 18 as well. As shown, the testing circuit 12 is characterized in that the selector 212 and latch 214 shown in FIG. 2 are implemented as a single master-slave flip-flop 500. Specifically, the master-slave flip-flop 500 has an input terminal D connected to the input terminal 204 to which test data from the main IC section 10 is applied. A trigger terminal C and a clock terminal CK also included in the master-slave flip-flop 500 are connected to the input terminals 202 and 206, respectively. The input terminals 202 and 206 receive respectively the switching signals from the outside and the clock signal from the main IC section 10. Further, a control terminal P is connected to the input terminal 208 for receiving data from the outside. The master-slave flip-flop 500 latches data applied to the input terminal D and then outputs the data to the tristate buffer 216 via an output terminal Q in response to the clock signal. The terminals C and P are controlled to allow any desired value to be fed from the output terminal Q to the tristate buffer 216. The testing circuits 12, 14, 16 and 18 with such a configuration are also built in each of the IC chips IC1 and IC2 and then tested by the previously stated procedure.

In summary, it will be seen that the present invention provides an IC chip with testing circuits and a method of testing the IC chip which allow external checking or a testing unit to test the IC chip even after the IC chip has been mounted on a circuit board by comparing test data sent to the IC chip and data returned from the IC chip. This advantage is derived from a unique construction wherein test data from the outside or data from a main the IC section included in the IC chip is selectively latched by the testing circuits and then selectively delivered to the main IC section or the outside via an inputting/outputting unit which is operated by a switching signal.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An integrated circuit (IC) chip capable of being independently tested comprising:
   a main IC section having a predetermined function; a plurality of testing circuits connected to said main IC section for freely extracting data inputted to and outputted from said main IC section; and
   an interface for selectively inputting test data from the outside of the IC chip to said plurality of testing circuits and outputting test data from said plurality of testing circuits to the outside;
   said plurality of testing circuits each comprising:
      test data holding means for selectively holding output data of said main IC section and test data from the outside; and
      inputting/outputting means for selectively inputting and outputting data fed from said test data holding means or data sent from the outside, whereby the IC chip can be tested after being mounted on a circuit board.

2. An IC chip in accordance with claim 1, wherein said test data holding means comprises:
   a selector for selecting between data received from the outside via said interface and data fed from said main IC section in response to a control signal also received from the outside via said interface; and
   latching means for latching data selected by said selector.

3. An IC chip in accordance with claim 1, wherein said test data holding means comprises a flip-flop for outputting predetermined test data in response to a control signal received from the outside via said interface and holding output data of said main IC section in response to a clock from said main IC section.

4. A method of testing IC chips after the IC chips have been mounted on a circuit board, comprising the steps of:
   integrating on the circuit board a main IC section having a predetermined function, a plurality of testing circuits for freely extracting data inputted to and outputted from said main IC section, and an interface for selectively inputting test data from the outside of one of the IC chips to said plurality of testing circuits and outputting test data from said plurality of testing circuits to the outside;
   selectively sending or receiving predetermined test data to and from the one IC chip via said interface by testing means connected to the IC chip after the one IC chip has been mounted on the circuit board;
   confirming connection of said testing means and the one IC chip by sending the test data from said testing means to said plurality of testing circuits, returning said test data from said plurality of testing circuits to said testing means via said interface, and then determining whether said test data returned is outputted correctly by said testing means;

repeating the confirmation with each of the other IC chips packaged together on a single circuit board, each of the other IC chips also having a main IC section, a plurality of testing circuits, and an interface;

connecting said plurality of testing circuits of the respective IC chips;

confirming connection of the IC chips by inputting test data from said testing means in said plurality of testing circuits of any one of said IC chips, transferring said test data to said plurality of testing circuits of the other IC chips, returning received data from said plurality of testing circuits of the other IC chips to said testing means via said interface of the other IC chips, and then determining whether said test data is outputted correctly by said testing means; and testing a function of each of the IC chips by extracting output data of said main IC section of any one of the IC chips by the plurality of testing circuits of the one IC chip, transferring said output data to said plurality of testing circuits of the other IC chips, returning said output data from said plurality of testing circuits of the other IC chips, to said testing means via said interface of the other IC chips, and then testing the received data by said testing means.

5. An integrated circuit chip capable of being independently tested comprising:

a main IC section for performing predetermined functions;

a plurality of testing circuits connected to said main IC section for freely extracting data inputted to and outputted from said main IC section, each of said plurality of testing circuits including, test data holding means for selectively holding test data output from said main IC section and test data received from an external source to the integrated circuit chip, inputting/outputting means for selectively inputting and outputting the test data from said test data holding means a system interface for selectively inputting the test data from said external source to said testing circuits and outputting the test data from said testing circuits external to the integrated circuit chip;

a first common bus for connecting said testing circuits to said system interface;

a second common bus for connecting said testing circuits to said main IC section; and a plurality of I/O terminals correspondingly connected to each of said testing circuits.

6. An integrated circuit chip in accordance with claim 5, wherein said test data holding means comprises:

a selector for selecting between the test data from said main IC section and the test data received from said external source in response to a control signal from said external source; and latching means for latching the test data selected by said selector.

7. An integrated circuit chip in accordance with claim 5, wherein said inputting/outputting means comprises first and second tristate buffers.

8. An integrated circuit chip in accordance with claim 5, wherein said latching means comprises a D-type flip-flop.

9. An integrated circuit chip in accordance with claim 5, wherein said test data holding means comprises a master-slave flip-flop for selecting between the test data from said main IC section and the test data received from said external source in response to a control signal from said external source and latching the test data selected.

10. A system for testing a plurality of integrated circuit chips disposed on a circuit board, comprising:

a system controller for generating and receiving test data; and an interface connected between said system controller and the circuit board for transferring the test data from said system controller to the circuit board;

each of said plurality of integrated circuit chips including, a plurality of testing circuits connected to said interface for sending and receiving said test data from said system controller, and a main IC section connected to said plurality of testing circuits for performing predetermined functions.

11. A system in accordance with claim 10, wherein said system controller further comprises comparing means for comparing the test data received from said plurality of testing circuits with the test data initially generated and sent from said system controller to determine whether the plurality of integrated circuit chips are correctly connected to said system controller.

12. A system in accordance with claim 11, wherein said system controller comprises:

first controlling means for placing one of the plurality of integrated circuit chips in an output mode after determining that the plurality of integrated circuit chips are correctly connected;

second controlling means for sequentially placing subsequent integrated circuit chips to the one integrated circuit chip in an input mode;

writing means for desired data into the one integrated circuit chip;

reading means for sequentially reading the data from the one integrated circuit chip via said subsequent integrated circuit chips after writing said desired data to the one integrated circuit chip by said writing means; and comparing means for comparing the data read out via said subsequent integrated circuit chips with said desired data written into the one integrated circuit chip to determine whether said subsequent integrated circuit chips are defective.

13. The integrated circuit (IC) chip in accordance with claim 1, further including means for inputting the test data parallel to said plurality of testing circuits.

* * * * *